UNITED STATES PATENT OFFICE.

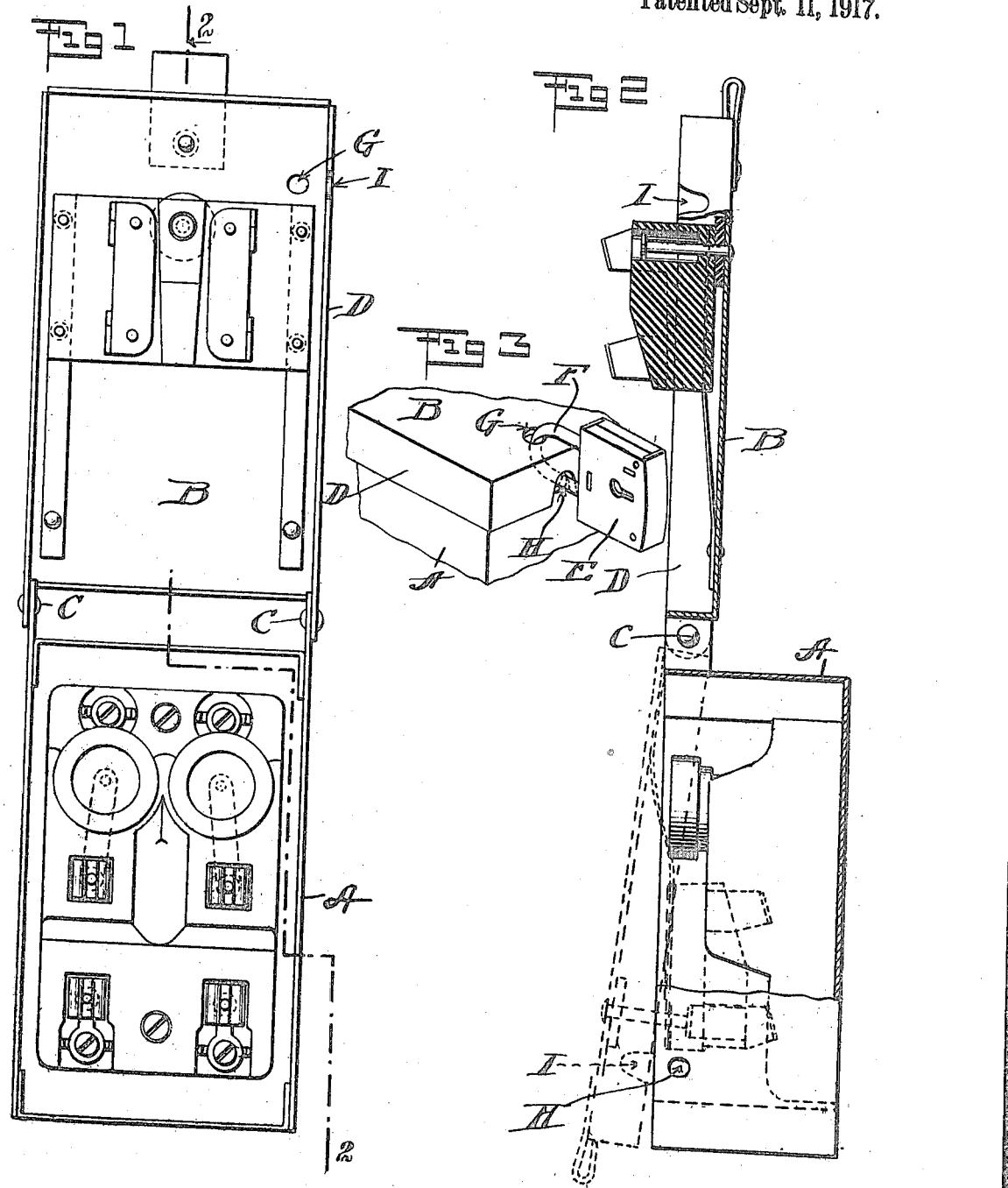

CLARENCE D. PLATT, OF BRIDGEPORT, CONNECTICUT.

COVER-LOCKING MEANS.

1,239,718. Specification of Letters Patent. Patented Sept. 11, 1917.

Original application filed August 2, 1916, Serial No. 112,710. Divided and this application filed April 18, 1917. Serial No. 162,864.

*To all whom it may concern:*

Be it known that I, CLARENCE D. PLATT, a citizen of the United States of America, residing at Bridgeport, Connecticut, have invented a new and useful Cover-Locking Means, of which the following is a specification.

My invention relates to boxes for electric switches and the like and particularly to a simple and effective means for locking the cover to the box body. This application is a division from my pending application Serial No. 112,710, filed Aug. 2, 1916.

In the accompanying drawings:

Figure 1 is a front view of a switch terminal box shown open to expose the contents.

Fig. 2 is a side elevation partly broken away and in section on the line 2—2 of Fig. 1.

Fig. 3 is a perspective view of the corner of the box showing the cover closed and locked.

A represents the body of a box or receptacle preferably made of sheet steel so as to effectively protect the contents when closed. B represents the cover for the box, the same being secured to the box in such a way that the securing means assists in holding the cover closed and yet permits the cover to be opened when unlocked. In the particular form shown the cover B is hinged at C—C to the end of the box A. The cover is constructed with an overlapping side flange D which further safeguards the box contents when the cover is closed. To securely lock the cover in place to guard against unlawful entry, I provide a very simple and effective means. The locking means proper is in the form of a pad lock E having a hasp F which passes through complementary holes G—H in the adjacent part of the cover B and the side of the box A, these complementary openings being close to the meeting angle formed by the closed cover B and the side of the box, as best seen in Fig. 3. The flange D of the cover is provided with a clearance passage in the form of a hole or notch designed to register with the hole H in the side of the box when the cover is closed. By this simple means when the cover is closed, the U-shaped hasp F of the pad lock when open may be passed through the holes G—H whereupon the pad lock may be closed thereby securely locking the cover to the box in the closed position.

I claim:

Locking means for a sheet metal switch box having a hinged cover flanged to overlap the side walls of the box body, the cover having an opening in the top thereof at a point remote from the hinged end thereof and a clearance opening in the overlapping flange adjacent said top opening, and the box body, having an opening in the side wall thereof, arranged to register with the clearance opening in the cover flange when the cover is closed, said locking means comprising a lock having a hasp member adapted to be passed through the opening in the top of the cover and through the opening in the side of the box and the clearance opening in the flange of the cover.

CLARENCE D. PLATT.